United States Patent
Schmidt et al.

(10) Patent No.: US 8,862,399 B2
(45) Date of Patent: Oct. 14, 2014

(54) GENERIC OBJECT EXCHANGE PROFILE MESSAGE

(75) Inventors: Andreas Schmidt, Braunschweig (DE); Norbert Schwagmann, Braunschweig (DE); Achim Luft, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/229,921

(22) Filed: Sep. 12, 2011

(65) Prior Publication Data

US 2011/0320624 A1 Dec. 29, 2011

Related U.S. Application Data

(62) Division of application No. 12/121,109, filed on May 15, 2008, now abandoned.

(30) Foreign Application Priority Data

May 22, 2007 (DE) .......................... 10 2007 023 702

(51) Int. Cl.
*G01C 21/00* (2006.01)
*G01C 21/36* (2006.01)

(52) U.S. Cl.
CPC .................................. *G01C 21/3661* (2013.01)
USPC ........................... 701/522; 701/540; 701/541

(58) Field of Classification Search
USPC ........... 701/24, 400, 421, 451, 452, 453, 483, 701/522, 540, 541; 340/995.12, 995.18, 340/995.1, 988, 995.14, 995.16, 995.57, 340/995.19, 990
See application file for complete search history.

(56) References Cited

U.S. PATENT DOCUMENTS

| 7,487,038 | B2 * | 2/2009 | Kitagawa et al. | 701/410 |
|---|---|---|---|---|
| 7,783,257 | B2 * | 8/2010 | Cannon et al. | 455/41.2 |
| 2003/0228842 | A1 * | 12/2003 | Heinonen et al. | 455/41.2 |
| 2005/0124357 | A1 | 6/2005 | Naick et al. | |
| 2005/0136949 | A1 * | 6/2005 | Barnes | 455/461 |
| 2006/0089160 | A1 * | 4/2006 | Othmer | 455/457 |
| 2006/0167628 | A1 * | 7/2006 | Karaoguz et al. | 701/211 |
| 2007/0124058 | A1 * | 5/2007 | Kitagawa et al. | 701/200 |
| 2008/0002692 | A1 * | 1/2008 | Meylan et al. | 370/390 |
| 2008/0039120 | A1 * | 2/2008 | Gad | 455/456.2 |

FOREIGN PATENT DOCUMENTS

| DE | 203 13 213 U1 | 10/2003 |
|---|---|---|
| DE | 102 27 287 A1 | 1/2004 |
| EP | 1 790 947 A1 | 5/2007 |
| KR | 2004-0020675 A | 3/2004 |
| WO | WO-2006/032962 A1 | 3/2006 |

OTHER PUBLICATIONS

Bluetooth Specification; Generic Object Exchange Profile—Part K:10, Version 1.1, Feb. 2001, pp. 309-338.
ST Microelectronics, Bluetooth Profiles Overview, Feb. 2001, pp. 1-19.

* cited by examiner

*Primary Examiner* — Rami Khatib
(74) *Attorney, Agent, or Firm* — Schwabe, Williamson & Wyatt, P.C.

(57) ABSTRACT

In a method for generating a generic object exchange profile message, navigation data is inserted into the generic object exchange profile message.

10 Claims, 8 Drawing Sheets

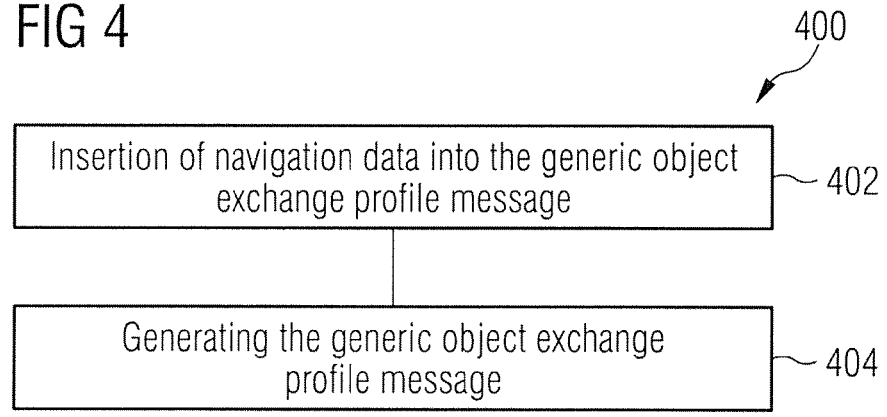
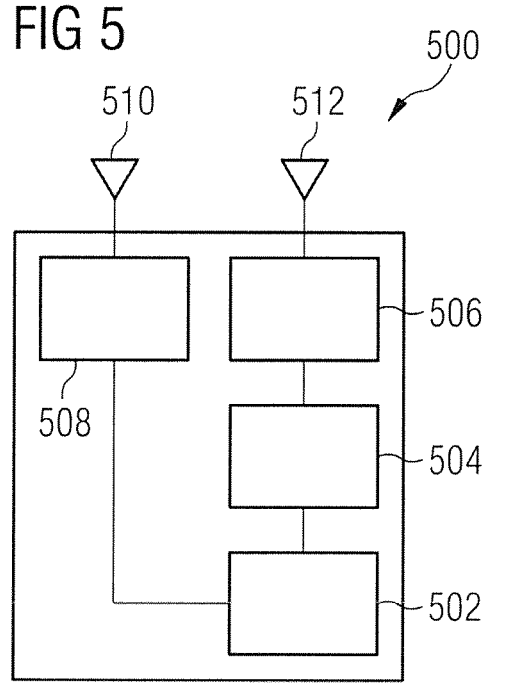

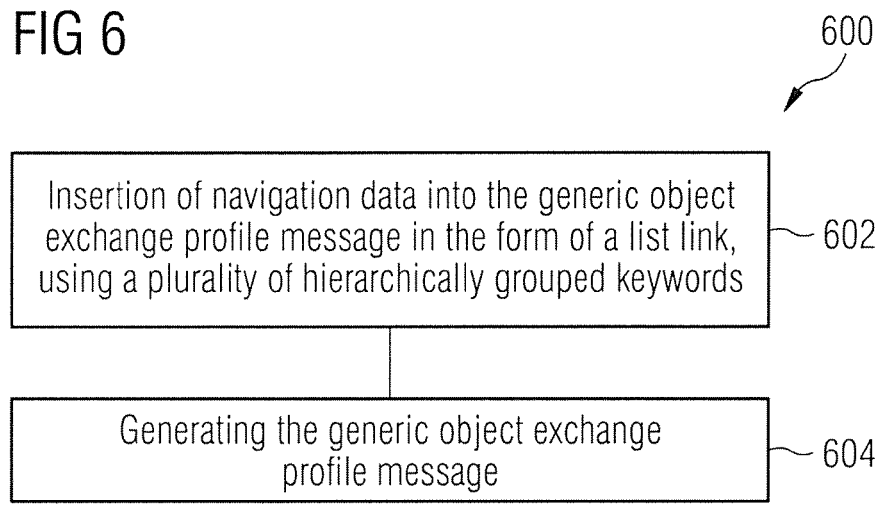
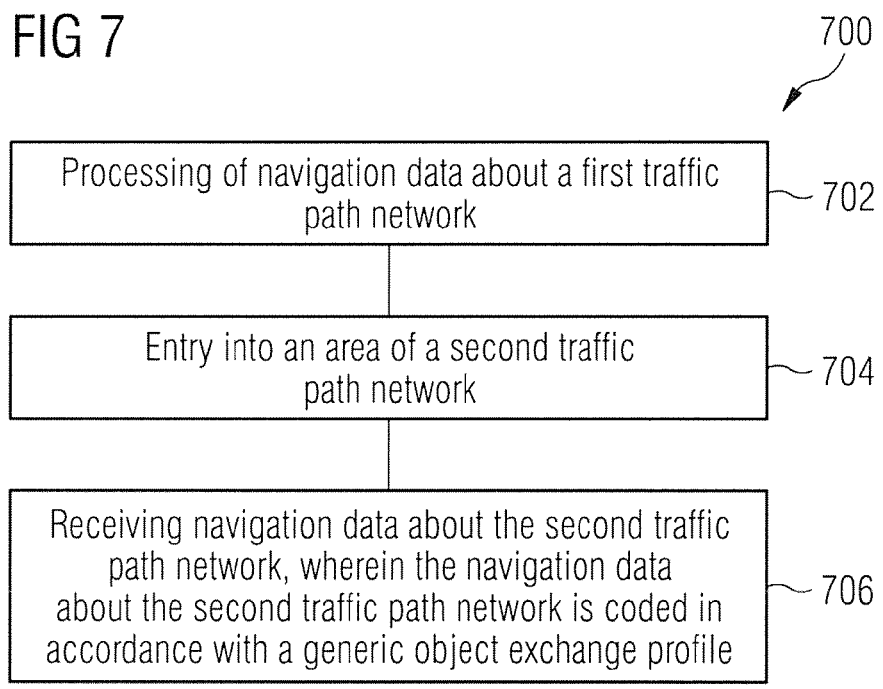

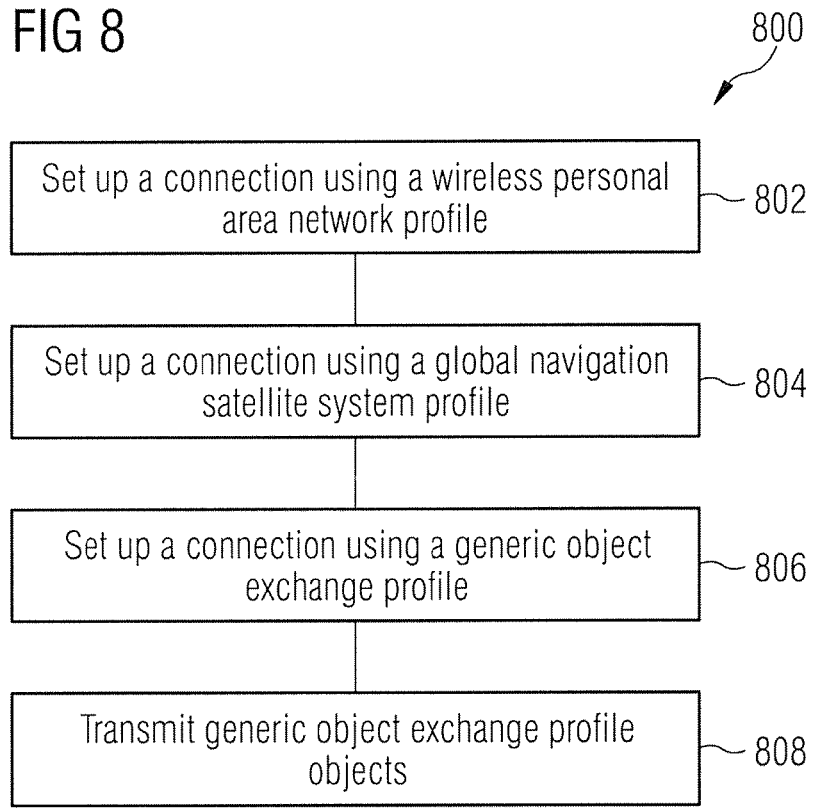

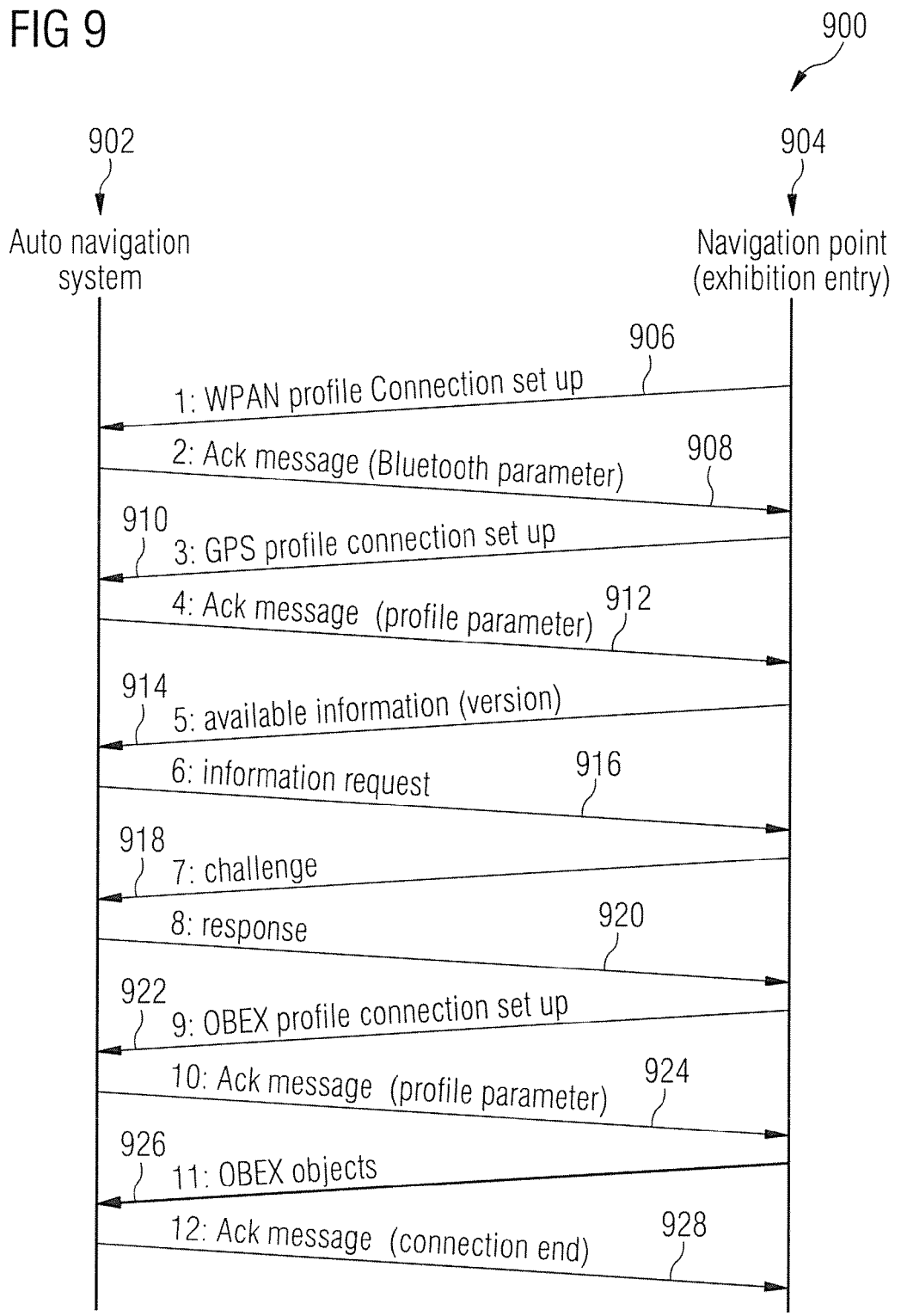

GENERIC OBJECT EXCHANGE PROFILE MESSAGE

CROSS REFERENCE TO RELATED APPLICATION

This application is a divisional of U.S. application Ser. No. 12/121,109, filed May 15, 2008, which claims priority to German Patent Application Serial No. 10 2007 023 702.4-31, which was filed May 22, 2007, each of which is incorporated herein by reference in its entirety.

TECHNICAL FIELD

Embodiments relate to methods for generating a generic object exchange profile message and to a method for providing navigation data, as well as a method for setting up a connection for transmission of navigation data.

BACKGROUND

An upgrade of existing navigation user systems for the exchange of information which is relevant for navigation, as well as a defined interface of a new profile for exchanging navigation data are desired.

BRIEF DESCRIPTION OF THE FIGURES

Embodiments will be explained in more detail in the following text, and are illustrated in the figures, in which:

FIG. 4 shows a first method for generating a generic object exchange profile message;
FIG. 5 shows a navigation terminal;
FIG. 6 shows a second method for generating a generic object exchange profile message;
FIG. 7 shows a method for providing navigation data;
FIG. 8 shows a method for setting up a connection for transmission of navigation data;
FIG. 9 shows a message flowchart for a Bluetooth connection set up for a generic object exchange profile.

DESCRIPTION

Figure 1:
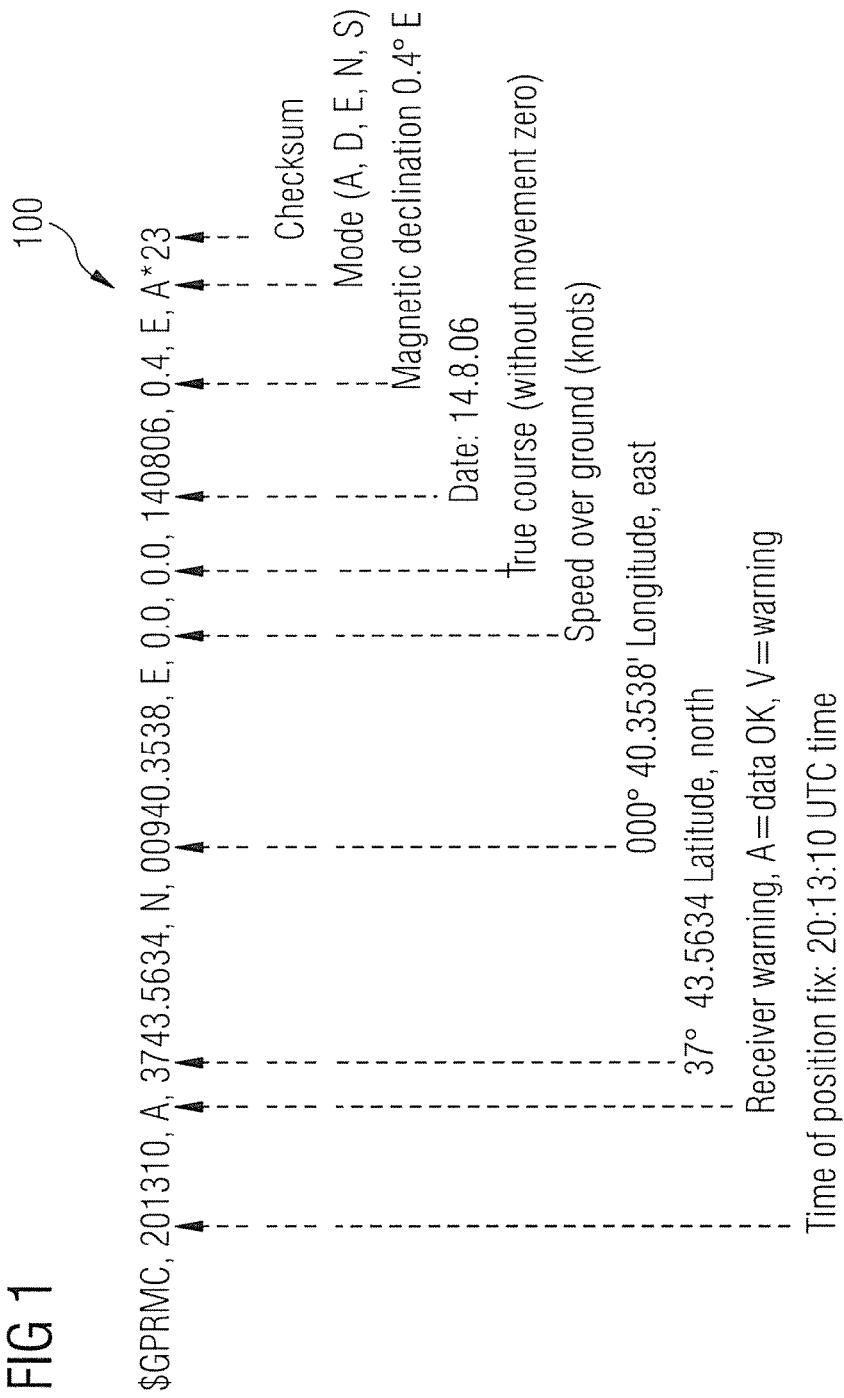
FIG. 1 shows an explanation of the NMEA format.

For the purposes of this description, the expressions "connected" and "coupled" are used to describe both a direct and an indirect connection, as well as a direct or indirect coupling. Identical or similar elements are provided with identical reference symbols in the figures, where this is expedient.

The expression GPS (global positioning system) is used in this description as a representative expression for existing satellite-based positioning and navigation systems, such as GPS or GLONASS as well as future systems, such as the European GALILEO, the Chinese compass, or the Indian IRNSS (Indian Regional Navigation Satellite System) or combinations of them. The expression GNSS (Global Navigation Satellite System), which is known by those skilled in the art, is equivalent.

One equipment feature which will be introduced evermore frequently in a motor vehicle is a navigation system which is either permanently installed or is mobile. The equipment for a system such as this is often closely linked to the motor vehicle electronics and the control elements in the cockpit. Communication with other appliances, such as a mobile telephone or a PDA (Personal Digital Assistant) is generally not envisaged. A navigation system provides a large amount of information which could also be used outside the system. Examples relating to this which may be mentioned are map books on PDAs or the capability for the actual position (for example road name) to be transmitted in a readable fashion to the mobile radio telephone. The importation of public or semi-public data would also represent added value for the user. One example that may be mentioned here is that an exhibition site could provide a layout plan of the exhibition halls, which is not shown on the road maps, with the current occupancy for delivery traffic at the entry to the exhibition site. Points of interest in towns or on company premises (for example car parks, churches, restaurants, etc.) could also be provided, if it were possible to communicate with the navigation equipment in motor vehicles via a defined interface.

According to one embodiment, an upgrade is provided for exchanging information which is relevant for navigation. Furthermore, a defined interface is described in the following text, using the example of a new Bluetooth profile.

Navigation systems exist which can act as a hands-free device for a mobile telephone by short-range communication such as Bluetooth, although no provision whatsoever is made, or provision is made only individually on a proprietary basis, for the exchange of navigation-relevant data, such as road names, addresses, estimated time to arrival, points of interest, GPS coordinates, maps of private sites or company premises provided with GPS coordinates. Conventional navigation systems scarcely communicate with their environment, if at all.

In addition to these navigation systems, so-called Bluetooth GPS mice also exist. These are small autonomous GPS receivers which transmit the received coordinates using a standardized method via a serial link (or else by radio, for example Bluetooth) for example to PDAs or laptops. All of the data evaluation and processing of the map material are in this case carried out in the PDA or laptop, however. The data is then output via the interface once every two seconds.

Many PC navigation and map programs with a connection capability for GPS receivers are awaiting the NMEA format for navigation, which provides for data in a minimal packet, as shown in FIG. 1.

So-called Bluetooth technology is being introduced at a greater extent for local networking of small mobile appliances, such as mobile telephones and PDAs (Personal Digital Assistant), as well as of computers and peripherals (for example a mouse and keyboard). Bluetooth is an industry standard for wire-free (radio) networking of appliances over a relatively short distance. Recently, Bluetooth has also increasingly been used in the automobile industry. In this case, the audible and/or visual input and output appliances and control elements (microphone, loudspeaker, displays, keys, etc.) which are permanently integrated in a motor vehicle are generally coupled without the use of wires to a mobile telephone which need no longer just be used for making telephone calls and, for example, may remain in a coat pocket throughout the entire journey.

Bluetooth networks, which are generally of an ad-hoc character (that is to say their appliances find and connect themselves automatically and spontaneously as soon as they are within range), are also referred to as WPANs (Wireless Personal Area Network). One Bluetooth appliance can maintain up to seven links with other Bluetooth appliances at the same time, with these appliances sharing the available bandwidth (shared medium). When more than two appliances are connected to one another by Bluetooth, this is referred to as a "Bluetooth piko network". Bluetooth provides equal support for the transmission of speech and data. Encryption of the transported data is likewise possible.

The basis of every Bluetooth system is conventionally a microchip, the so-called Bluetooth module. This requires little power, offers integrated security mechanisms and can be produced relatively cheap. It can therefore be used in a wide range of electronic appliances. In principle, a Bluetooth module includes an RF (radio-frequency) section and a baseband controller, which represents the interface to the host, for example the PC, laptop or mobile telephone (details relating to this will be described more comprehensively in the following). The Bluetooth Standard defines three transmission power classes of 1 mW (0 decibels (power level)), 2.5 mW (4 dBm) and 100 mW (20 dBm), which allow ranges from 10 m to 100 m (in this context, see Table 1).

Modern Bluetooth modules draw little current; the current drawn is about 0.3 mA in the standby mode, and otherwise reaches a maximum of 140 mA. The receiving sections have a sensitivity of at least −70 dBm and operate with a channel width of 1 MHz. Bluetooth appliances transmit in the unlicensed ISM band, between 2.402 GHz and 2.480 GHz. They can be operated without licenses throughout the world. However, interference can be caused, for example, by WLAN networks, cordless telephones, garage door openers or microwave ovens, which likewise use the ISM frequency band. In order to achieve robustness against interference, frequency hopping methods are used, in which the frequency band is subdivided into 79 frequency steps at intervals of 1 MHz, which are changed up to 1600 times per second (there are also packet types in which changes do not take place as often). At the lower and upper ends, there is in each case a frequency band as a guard band from adjacent frequency ranges. In the case of Bluetooth Version 1.2 (and lower), a theoretical data transmission rate of 723.2 kbits can be achieved for downloading (net in the download) with 57.6 kbits at the same time for uploading (net in the upload). Bluetooth Version 2.0 includes an upgrade which is known by the name EDR ("Enhanced Data Rate"), which allows data transmission at a maximum of three times as fast, that is to say at around 2.2 Mbit/s (net in the download).

TABLE 1

Bluetooth power classes

| Class | Maximum transmission power | Minimum range for a visual link |
|---|---|---|
| 1 | 100 mW/20 dBm | 100 m |
| 2 | 2.5 mW/4 dBm | 20 m |
| 3 | 1 mW/0 dBm | 10 m |

The theoretical ranges for Bluetooth appliances of 10 to 100 meters (dependent on the power class, see Table 1) can be increased further with little effort, so that, by way of example, a Bluetooth-compatible mobile telephone can be addressed from a PC via a modified dongle using a directional link with visual contact at a range of up to about 1.5 kilometers.

As soon as Bluetooth appliances are operated, the individual Bluetooth controllers identify themselves within two seconds by an individual 48-bit long serial number which cannot be confused. In the standby mode, unconnected appliances check for messages from possible other locations at intervals of 1.28 seconds, and in the process check 32 hop frequencies. A connection may originate from any desired appliance, which is therefore referred to as the master. The slaves are contacted by an enquiry message followed by a page message if the hardware address of the appliances is unknown. The first step is omitted if the address is known. In the page mode, the master 16 transmits identical page messages on 16 different hopping frequencies which are intended for the slaves. The stations are then in the "connected" status. On average, a connection is set up within 0.6 seconds.

If there is no data to be transmitted, the master in a piko net can switch its slave opposite numbers to a hold mode in order to save power. Further power saving states which are particularly suitable for applications in mobile terminals such as mobile telephones are the SNIFF and PARK modes. In the SNIFF mode, a slave operates on a reduced cycle, while in the PARK mode, an appliance still remains synchronized, but dose not take part in the traffic.

The Bluetooth baseband is a combination of line and packet switching, and operates with two different types of connection:

Synchronous Connection Oriented (SCO)

Synchronous connection-oriented communication provides a symmetrical, line-switched point-to-point connection between a master and a slave. The master reserves transmission time slots at regular intervals; the master can transmit data to the slave in a fixed time slot (the so-called SCO intervals, TSCO); the slave can transmit its data in the next time slot. A master can support up to three SCO links to one or more slaves. A slave can maintain up to three SCO links with one master or a maximum of two SCO links with different masters. SCO links are designed to ensure efficient voice transmission. Each SCO link can transmit voice at 64 kbit/s. There is no data integrity check for SCO links.

If data is lost during transmission, no repeat transmission takes place since this would mean a delay for the subsequent data packets. A very robust method, so-called continuous variable slope delta (CVSD) modulation, is generally used to code voice data. CVSD is a type of delta modulation in which the step width of the approximated signal is progressively increased or decreased in order to better match the approximated signal to the analog input signal. In the implementation, only the negative or positive changes from the previous value are indicated by a bit. CVSD normally operates using sampling rates of 32 kHz. Implementations also exist which operate at a lower sampling rate.

Asynchronous Connectionless (ACL)

Asynchronous connectionless communication provides a connectionless packet-switching service. An ACL link can be used whenever the channel is not reserved for SCO (SCO has priority). Only one ACL link can ever be set up at one time between a master and a slave. In the course of an ACL link, a master can also transmit packets to all the slaves in its piko network (broadcast). In this case, the master just uses the packet header to indicate that there is no destination address specified in more detail. ACL links are designed for efficient data transmission. In this case, the delay is generally of secondary importance during transmission, while the data integrity is highly important.

Packets for one, three or five time slots may be used for data transmission. The payload (apart from a specific type of packet which will not be explained in more detail at this point) is always protected by a checksum. In addition to the two methods for forward error correction, Bluetooth therefore also provides a method for automatic transmission repetition (automatic repeat request—ARQ) in order to offer reliable data transmission in this way.

While an SCO link is always symmetrical, that is to say the back channel and forward channel have the same bandwidth (see Table 2), an ACL link may be operated both in a symmetrical form and in an asymmetric form (see Table 3).

TABLE 2

SCO link overview

| Type | Header field [bytes] | Payload data [bytes] | FEC | CRC | Maximum symmetrical data rate [kbit/s] |
|---|---|---|---|---|---|
| HV1 | n.a. | 10 | 1/3 | Yes | 64.0 |
| HV2 | n.a. | 20 | 2/3 | Yes | 64.0 |
| HV3 | n.a. | 30 | No | Yes | 64.0 |
| DV | 1 D | 10 + (0-9) D | 2/3 D | Yes | 64.0 + 57.6 D |
| EV3 | n.a. | 1-30 | No | Yes | 96.0 |
| EV4 | n.a. | 1-120 | 2/3 | Yes | 192.0 |
| EV5 | n.a. | 1-180 | No | No | 288.0 |

TABLE 3

ACL link overview

| Type | Header [bytes] | Payload data [bytes] | FEC | CRC | Maximum symmetrical data rate [kbit/s] | Maximum asymmetric data rate (Uplink) [kbit/s] | Maximum asymmetric data rate (Downlink) [kbit/s] |
|---|---|---|---|---|---|---|---|
| DM1 | 1 | 0-17 | 2/3 | Yes | 108.8 | 108.8 | 108.8 |
| DH1 | 1 | 0-27 | No | Yes | 172.8 | 172.8 | 172.8 |
| DM3 | 2 | 0-121 | 2/3 | Yes | 258.1 | 387.2 | 54.4 |
| DH3 | 2 | 0-183 | No | Yes | 390.4 | 585.6 | 86.4 |
| DM5 | 2 | 0-224 | 2/3 | Yes | 286.7 | 477.8 | 36.3 |
| DH5 | 2 | 0-339 | No | Yes | 433.9 | 723.2 | 57.6 |
| AUX1 | 1 | 0-29 | No | No | 185.6 | 185.6 | 185.5 |

Both link types, SCO and ACL, use a time-division multiplexing method for duplex data transmission. Two or more information channels can be transmitted over the same link in this way by allocating each channel a different time interval (slot). Specific time intervals may be reserved for synchronous data packets, with each packet being transmitted at a different hop frequency. One packet normally covers a single time interval, but may also occupy up to five slots.

The Bluetooth Standards cover not only the physical layer for generic short-range communication which is used for general data interchange. In fact, the Standards likewise define different profiles which describe a specific task with all the entities and functions involved. The Bluetooth Standard covers hardware and software. For example, a profile is standardized which transmits the battery state of an appliance equipped with Bluetooth to another appliance. There are further profiles for audio/video transmission, audio/video remote control, image transmission, cordless telephony, dialed connection into the Internet, file transmission, printing applications, headset voice output, input appliances, address and schedule interchange, reading SIM cards and serial transmission. Two or more profiles may be used in parallel.

Figure 2:
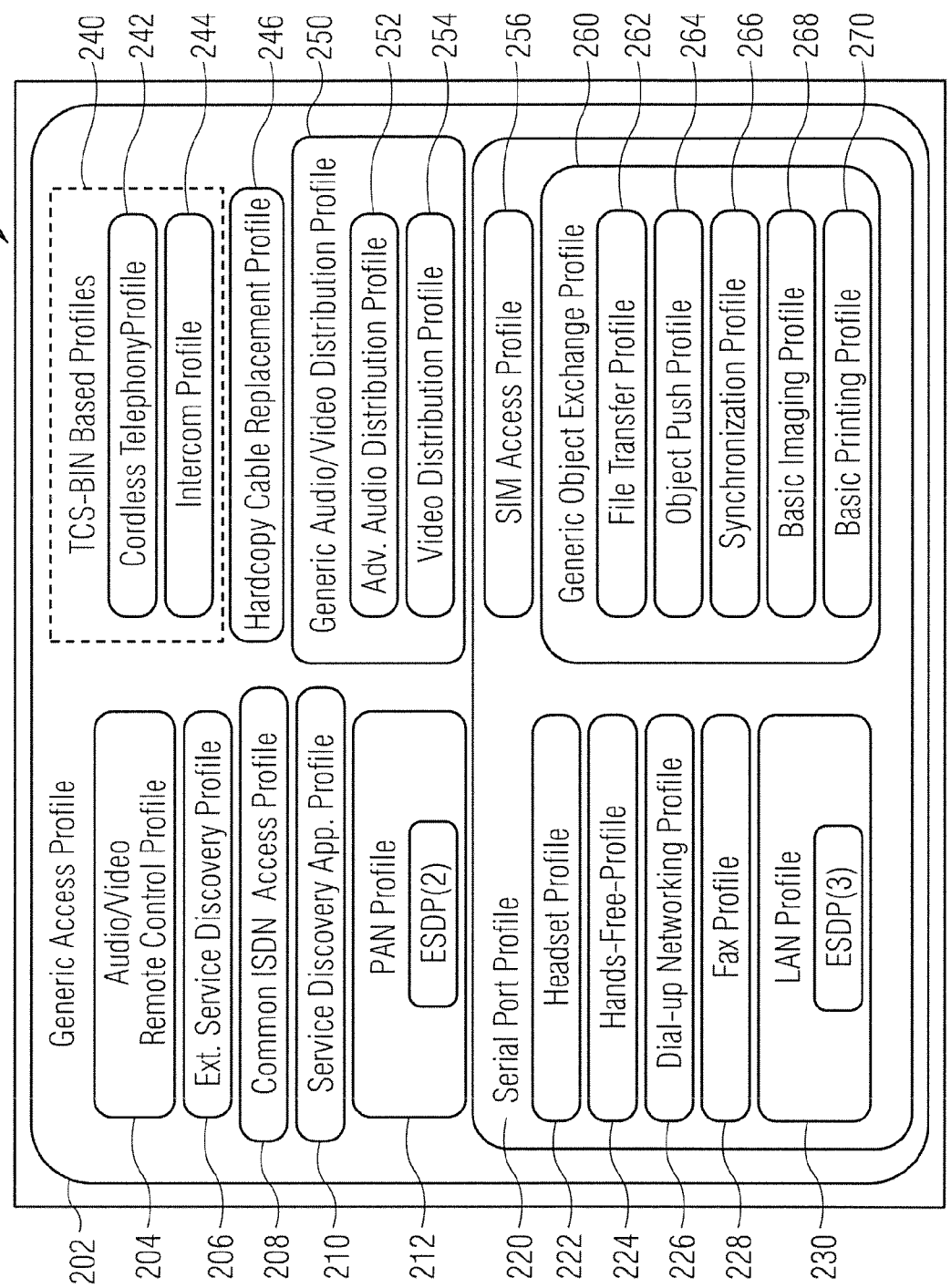
FIG. 2 shows an overview of Bluetooth profiles.

In addition to the physical transmission methods and protocol layers that have already been mentioned above, the Bluetooth SIG (SIG—Special Interest Group) Committee, which is responsible for standardization of the Bluetooth technology, also defines application profiles ("Bluetooth profiles") which are intended to guarantee interaction between Bluetooth appliances from widely different manufacturers. Both rules and protocols for a dedicated application scenario can be defined in an application profile such as this. In many cases, an application profile may be understood as a vertical slice through the entire protocol layer model, since it defines the obligatory protocol components for each protocol layer, or defines application-profile-specific parameters for a specific protocol layer. This ensures a high degree of interoperability. Furthermore, the use of application profiles results in the advantage for the user that there is no need to match two or more terminals to one another manually. In this case, Bluetooth also allows a plurality of profiles at the same time. Table 4 and FIG. 2 provide an overview of a number of modern significant Bluetooth application profiles.

TABLE 4

Bluetooth Profiles (selection)

| Abbreviation | Profile | Application |
|---|---|---|
| GAP | Generic Access Profile | Basic method for authentication and setting up connections |

TABLE 4-continued

Bluetooth Profiles (selection)

| Abbreviation | Profile | Application |
|---|---|---|
| A2DP | Advanced Audio Distribution Profile | Wire-free stereo link for loudspeakers or headsets |
| SDAP | Service Discovery Application Profile | Service check of currently visible neighbors |
| CIP | Common ISDN Access Profile | ISDN-CAPI interface |
| PAN | Personal Area Network | Network link to Ethernet |
| SPP | Serial Port Profile | Serial interface |
| DUNP | Dial-Up Networking Profile | Internet access |
| CTP | Cordless Telephony Profile | Cordless telephony |
| HSP | Headset Profile | Cordless headset |
| HCRP | Hardcopy Cable Replacement Profile | Printing |
| HID | Human Interface Device | Keyboard and mouse connection |

TABLE 4-continued

Bluetooth Profiles (selection)

| Abbreviation | Profile | Application |
| --- | --- | --- |
| | | (man-to-machine interface) |
| GOEP | Generic Object Exchange Profile | Object exchange |
| HFP | Hands Free Profile | Manufacturer-independent communication between a mobile telephone and a hands-free device |
| FTP | File Transfer Profile | File transmission |
| BIP | Basic Imaging | Image transmission |
| BPP | Basic Printing | Printing |
| FaxP | Fax Profile | Fax |
| IntP | Intercom Profile | Intercom |
| PAN | Personal Area Network | Wire-free coupling to Ethernet (LAN) |
| OPP | Object Push Profile | Transmission of, for example, schedules and addresses |
| SAP | SIM Access Profile | SIM card access |
| GAVDP | Generic AV Distribution | Audio and video transmission |
| AVRCP | Audio Video Remote Control | Audio/video remote control |
| ESDP | Extended Service Discovery Profile | Extended service identification |
| SP | Synchronization Profile | File synchronization |

Some of the profiles are dependent on other profiles. For example, the profile file transfer profile 262, the object push profile 264, the synchronization profile 266, the basic imaging profile 268 and the basic printing profile 270 depend on the generic object exchange profile 260. All the profiles depend on the generic access profile 202, that is to say they reuse it.

The most important profile is therefore the generic access profile (GAP) 202 with basic functions for setting up connections and for authentication, on which all the other application profiles are based. This also includes the common format requirements for parameters which can be accessed at the user interface level. Every Bluetooth appliance supports GAP.

The audio/video remote control profile 204 defines the transmission of a user-activated A/V control signal to a Bluetooth appliance.

The extended service discovery profile 206 (ESDP) offers extended capabilities over the profile service discovery profile (SDAP) for searching for other Bluetooth appliances and for identification of services offered, in particular in scatter networks. It is also possible to access services of other Bluetooth profiles, such as PAN or LAN.

The common ISDN access profile 208 defines how applications can be accessed on ISDN via Bluetooth.

The service discovery application profile 210 is used to search for other Bluetooth appliances within range, and controls the determination of services offered on the basis of the service discovery protocol (SDP). On first entering a piko network, the Bluetooth profiles offered by the master of the piko network can therefore be checked.

The personal area networking profile (PAN) 212 defines the IP (Internet Protocol)-based networking, and offers support for network access points.

The serial port profile (SPP) 220 defines the requirements for emulation of serial cable links. The group of SAPs includes the headset profile 222 for the transmission of audio data for cordless headsets, the hands-free profile (HFP) 224 for manufacturer-independent communication between a mobile telephone and a hands-free device, the dial-up networking profile 226 in order to allow Internet access, the fax profile 228 for wire-free fax transmission by means of a Bluetooth mobile radio or modem, and the LAN profile 230. The LAN (Local Area Network) profile 230 defines how Bluetooth appliances can access services of an LAN and the formation of a Bluetooth LAN.

The cordless telephony profile 242 and the intercom profile 244 define profiles in order to use a Bluetooth telephone as a cordless telephone, as a walkie talkie and as a mobile radio telephone. These profiles are based on the telephony control protocol-binary (TCS-BIN) 240. The TCS-BIN 240 defines the call control signaling for setting up voice and data links between Bluetooth appliances.

The hardcopy capable replacement profile 246 is used for printing and scanning any desired document.

The generic audio/video distribution profiles 250-254 fundamentally define the distribution of audio and video contents.

The SIM access profile (SAP) 256 defines how a SIM card can be accessed via a Bluetooth link.

The generic object exchange profile 260 is described in more detail further below. This profile includes the file transfer protocol (FTP) 262, the object push profile 264, in order to allow users to exchange ("push", "pull", "exchange") simple objects, such as business cards, the synchronization profile 266 for automatic synchronization of data (for example schedules, calendar data), the basic imaging profile 268 in order to exchange the size and the coding of image data, and the basic printing profile 270 for printing text e-mails, short messages and formatted documents.

Figure 3:
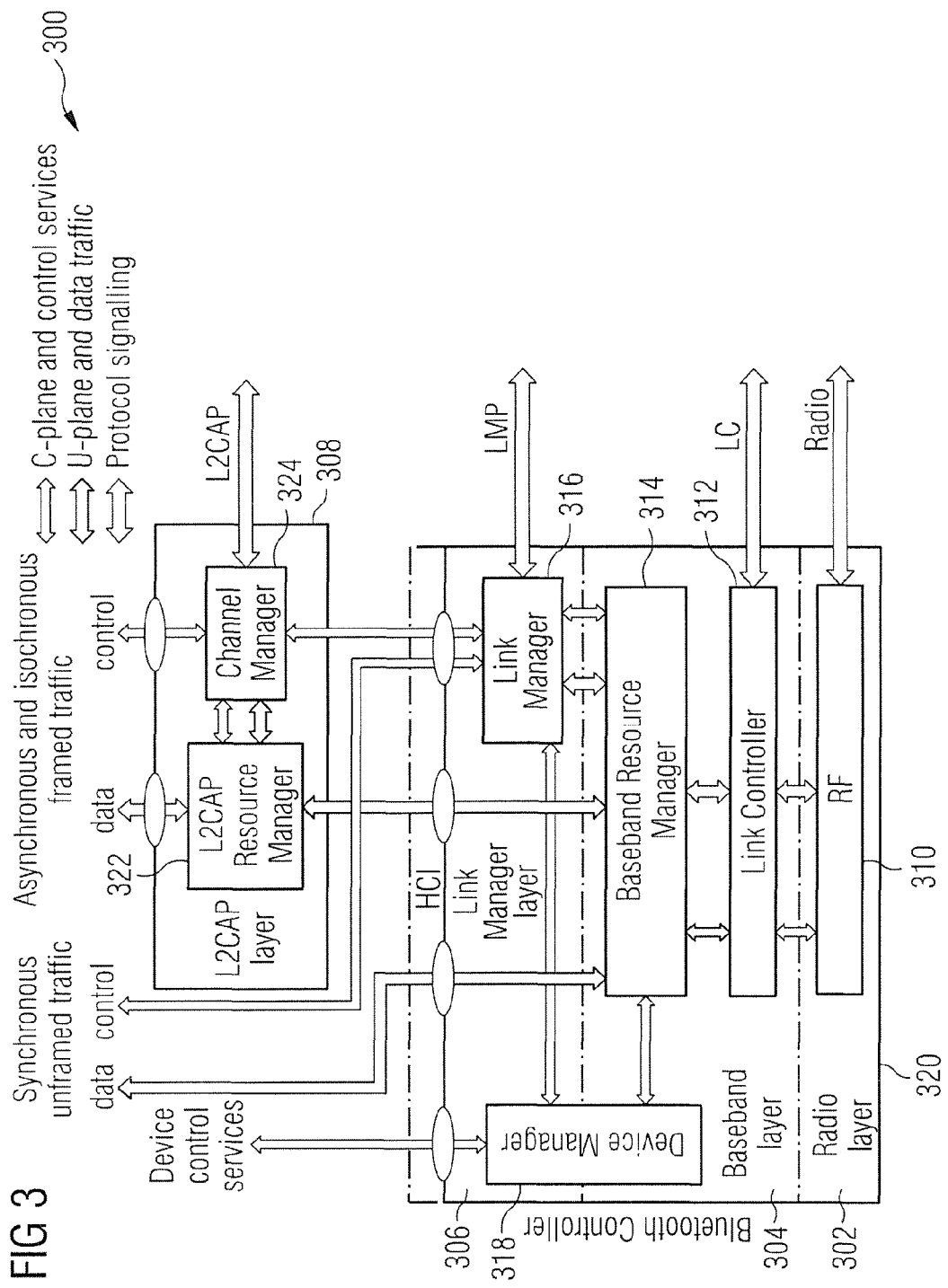
FIG. 3 shows the Bluetooth protocol layers.

The Bluetooth protocol layers are illustrated graphically in FIG. 3.

The lowermost layer is represented by the radio layer 302, followed by the baseband layer 304, the link manager layer 306 and the L2CAP layer 308.

The radio layer 302 forms the physical radio transmission layer, in which the RF block 310 is responsible for sending and transmitting data via the physical channel. This passes the data at the user level (U-plane) and the control level (C-plane) on to the link controller and vice versa.

The link controller is responsible for coding and decoding the Bluetooth data packets, and carries out the connection control protocol signaling.

The baseband layer 304 can control the timing and the carrier frequency of the RF block 310 via the control path.

The baseband resource manager 314 controls the access to the radio resources, by dealing with "access orders", that is to say agreement of the service quality required for the application, with all entities which wish to access the radio medium, and ensures that these entities have time on the physical channels.

The link manager 316 provides and modifies the logical links and releases them again, and is responsible for updating the parameters relating to the physical link. The link manager 316 communicates with the link manager of the remote Bluetooth appliance via the LMP (Link Management Protocol).

The device manager is responsible for the general behavior of the Bluetooth appliance and for functions which are not directly involved in data transport, such as searching for and identification of other Bluetooth appliances. The device manager is given access to the transport medium on request to the baseband controller. The device manager can receive commands via the host controller interface in order to control the local behavior, for example the administration of the local appliance name, stored connection keys and other functions.

The units in the radio, baseband and link manager layers are part of the Bluetooth controller 320.

The L2CAP (Logical Link Control and Adaptation Layer Protocol) resource manager 322 handles and organizes, inter alia, the PDU (Packet Data Units) fragments, which are intended to be sent to the baseband.

The channel manger 324 creates, handles and cancels the L2CAP channels for transmission of the service protocols and application data streams. The channel manager communicates with the channel manager of a remote appliance via the L2CAP protocol in order to create these L2CAP channels and to connect their end points to the appropriate units. The channel manager communicates with the local link manager in order, as appropriate, to produce new logical links and to configure these links, in order to provide the required quality of service for the type of data to be transmitted.

FIG. 4 shows a method for generating a generic object exchange profile message based on one embodiment. In this case, navigation data is inserted at 402 into the generic object exchange profile message, and the generic object exchange profile message is generated at 404.

A generic object exchange profile (OBEX) is one of the Bluetooth profiles that have been described above, and is used for generic data exchange. It is based on the serial port profile and it has been transferred from the IrDA Standard (Standard for data transmission via an infrared interface). Two appliances can set up a serial link via Bluetooth, and can exchange objects via it. Address synchronization and the transmission of calendar data are based on this profile. The objects which can be exchanged using this profile are precisely defined.

FIG. 5 shows a navigation terminal according to one embodiment, having a unit 502 for generating a generic object exchange profile message; and a unit 504 for insertion of navigation data into the generic object exchange profile message.

According to one embodiment, the navigation terminal contains a communication unit 506, which will be described in more detail later, with a Bluetooth antenna 512 and a GNSS receiving unit 508 with a GNSS antenna 510.

According to one embodiment, at least some of the navigation data is inserted into the generic object exchange profile message in the form of at least one of the following main or additional formats for generic object exchange profile objects:

Main Formats for Objects:

| Basic text | Unicode Character Stream |
|---|---|
| vCard | Vcard is a MIME Standard for mail servers |
| vCalendar | Vcalendar is a MIME Standard for mail servers |
| vMessage | vMessage is a MIME Standard for mail servers. |

Additional Formats for Objects:

| XTHTML | Compatible with the XHTML Standard |
|---|---|
| Postscript 2 | Adobe protocol for text and graphic |
| Postscript 3 | Adobe protocol for text and graphic |
| PCL5E | Hewlett Packard for text and graphic |
| PCL3E | Hewlett Packard for text and graphic |
| PDF | Adobe Acrobat format for ebooks and on-line documents |
| JPEG | Image compression method |
| GIF89A | Unisys compression method for images |

The vCard format is in this case suitable for the transmission of navigation data. According to one embodiment, this data may be satellite-based position data, such as GNSS (Global Navigation Satellite System), that is to say for example GPS (Global Positioning System), GALILEO- or GLONASS- (Global Navigation Satellite System) data.

For the purposes of this description, by way of example, the expression "navigation data" means geographic coordinates and velocity, but also geographic information in the wider sense with regard to positioning and navigation, that is to say including position-related information that is relevant for a specific location or a region, such as GIS (Geographic Information System) data and information, or else geographic maps.

According to one embodiment, as will be explained in the following text, the navigation data is inserted into the generic object exchange profile message using at least one keyword.

FIG. 6 shows a second method, according to a further embodiment, for generating a generic object exchange profile message.

According to this embodiment, navigation data is inserted at 602 into the generic object exchange message in the form of a list link, using a plurality of hierarchically grouped keywords, and the generic object exchange profile message is generated at 604.

The following example shows how a navigation system transmits the current position (both GPS data such as a legible address and the current time) by means of Bluetooth OBEX vCard:
BEGIN: VCARD VERSION: 3.0 PROFILE: VCARD FN: Navigation Current Position N: Current Position; Navigation;;; ADR; TYPE=INTL:;; Musterstraβe; Braunschweig; Lower Saxony; 38100; Germany TZ: +02\:00 GEO: 34.223344,45.234442 UID: 2d5bf0e72880373b4096ed2c3647681c REV:2006-08-09T04\:13\:54Z PRODID:-//NEW BT GPS SYSTEM DEVICE//EN END: VCARD.

This example is based on the name of the vCard containing the keyword, which makes it possible to identify what information this relates to. In this case, the keyword is "Navigation Current Position" and indicates that this is the current position.

Other keywords, such as start position, destination address, favorite or point of interest are also feasible.

According to one embodiment, this therefore allows at least one of the following data items to be inserted as navigation data into the generic object exchange profile message:
  a start address;
  an intermediate destination address;
  a destination address;
  at least one navigation map.

A plurality of intermediate addresses or so-called track list addresses can also be inserted. A plurality of addresses such as these may, however, also be transmitted by linked lists or linked messages, as described further below.

According to one embodiment, additional, position-related information can also be inserted into the generic object exchange profile message.

For example, relatively complex information such as jam messages could also be transmitted by means of a vCard with an appropriate keyword. The Traffic Message Channel (TMC) may be mentioned as one example in this case. This is a free digital broadcast data service which is transmitted using RDS. Jams or other traffic holdups are transmitted to a receiver (generally directly in the navigation system or via an interface with the aid of a broadcast radio receiver). Since this information is transmitted in real time and permanently, the subscriber is less dependent on the traffic information, which is merely transmitted every half hour, from a normal broadcast radio receiver. In addition, the data can be included directly in the route planning without any manual input by the subscriber in the navigation system. As can be seen from the following example, this dynamic traffic guidance data can likewise be transmitted by means of the vCard format:

BEGIN: VCARD VERSION: 3.0 PROFILE:VCARD FN: Navigation New Congestion N: New Congestion; Navigation;;; ADR; TYPE=INTL:; between Braunschweig Hafen and Braunschweig Neinrd; A2; Braunschweig; Lower Saxony; 38112; Germany TZ:+02\:00 GEO:87.312323, 12.764564 NEINTE: 5 kilometer jam following an accident. Only the left-hand lane is in use.

UID:72223a9ff5109675bfa3b06e5fc77bbe REV: 2006-08-09T04\:28\:36Z PRODID:-//LOWER SAXONY AUTOMATIC TRAFFIC MONITORING//EN END: VCARD According to one embodiment, an index is inserted in addition to a keyword.

This allows transmission of position or address lists using the vCard format. For example, if a list of the last 10 destinations driven to is to be transmitted with the time of arrival from the navigation appliance to a laptop in order to create an electronic driving log, the addresses could be transmitted as described above by means of 10 vCards, with the keyword also including the information about which element from a list this currently relates to. By way of example, this could appear as follows:

"Navigation History List—3/10 id:7837x93hd64 kg278".

This example relates to the third element from a list including a total of 10 elements of the last destinations driven to.

These linked lists can also be used, for example, to transmit track lists in a simple manner.

According to one embodiment, a message identity is inserted into the generic object exchange profile message, in order to link a plurality of object exchange profile messages, as will be explained in more detail in the following text.

Further information which is of interest for navigation purposes is, for example, the map of the area surrounding the destination address. This could likewise be transmitted by means of a vCard, making use of the fact that a vCard can also contain an image, from Version 3.0. A further option would be to link two objects to one another. For example, an address could be transmitted as a vCard, with the associated map of the surrounding area being transmitted as a JPG-compressed image. Both objects could likewise be linked via the keywords. This could appear as follows:
vCard keyword: "Navigation Target Address—1/2 id:7837x7n893274y98";
map keyword: "Navigation Target Map—2/2 id:7837x7n893274y98".

According to one embodiment, the navigation data can be inserted into the generic object exchange profile message in the form of a list link, using a plurality of hierarchically grouped keywords.

The two objects can be linked to form a packet by means of the ID, which is created from a random number or a counter. The indexing transmits the information that this relates to a plurality of associated objects, and which of these elements this relates to. The insertion of an ID is also advantageous for indexing of lists, since this allows different lists to be separated from one another. The formation of a hierarchical structure also allows interleaving of packets when a plurality of linking levels is introduced.

A further field, which is used repeatedly, in navigation is the inclusion of so-called off-road maps or overlay files. While the map material in navigation appliances contains vector-based road profiles with the area surrounding the vicinity of the road likewise on a vector basis, navigation away from the road network, for example on large company or exhibition sites or in wildness areas (mountain biking or hiking), is of only little use. The current position can admittedly be determined, but the map material in these regions is too incomplete for further information.

In this case, many navigation systems offer the capability to import dedicated maps. A precondition for the maps according to one embodiment is exact alignment with respect to north. It is also necessary to know the GPS coordinates of the top left and bottom right corners. The map can thus be calibrated in the navigation system. In this context, it should be noted that, in another embodiment, the importation of dedicated maps can be simplified by means of algorithms in the navigation appliance, for example by superimposition of manually marked or automatically identified characteristic points on the respective map.

The system cannot navigate in these regions, without track lists which have likewise been imported. However, track lists can be imported in ASCII (American Standard Code for Information Interchange) which also allows routes away from the public road network. This data can also be imported and exported using OBEX objects. The ASCII track lists can be transmitted using vMessages. Additional map material can be transmitted in one of the image format objects. Additional information for calibration relating to the image data could be transmitted in the metadata of the image (using the example of JPEG, this is the EXIF data). Transmission is also feasible using a different additionally linked (see the description above) OBEX object (for example vMessage).

The abovementioned refinements also apply, while this is worthwhile, to the further methods as described below and to the navigation terminal which is described further below, as well as the navigation data insertion unit.

FIG. 7 shows a further embodiment of a method for providing navigation data.

According to this embodiment, navigation data about a first traffic path network is processed at 702. By way of example, the first traffic path network may be an already known traffic path network which is stored in any desired form, for example on CD or in an internal or external memory, for example as a vector-based graphic, in the navigation system.

An area of a second traffic path network is entered at 704. The second traffic path network may, for example, be an unknown traffic path network about which the navigation system has until now had no information, or only inadequate information.

The navigation data about the second traffic path network is received at 706, with the navigation data about the second traffic path network being coded in accordance with a generic object exchange profile. In one example, position-related information, such as maps, addresses, positions, etc., can be transmitted here.

According to one embodiment, a navigation terminal contains a processing unit for processing navigation data about a first traffic path network, and a receiving unit in order to receive navigation data once the navigation terminal has entered an area of a second traffic path network, with the navigation data about the second traffic path network being coded using a generic object exchange profile.

Not only the transmission between two or more subscriber terminals may be mentioned as an embodiment here, but also, explicitly, the transmission of terrain data away from the public road network to dedicated appliances.

In this context, by way of example, it is feasible to provide Bluetooth access points at the entry to an exhibition site. The appliance could transmit additional data material, track lists, points of interest data and additional information such as exhibitor lists. Transmission is predicated on a standardized protocol and may be extended within the capabilities of the existing Bluetooth profiles by access rights (for example different information level between visitors and employees or specific information (building plans) for rescue services).

A further embodiment is shown in FIG. 8, which illustrates a method for setting up a connection for transmission of navigation data.

According to this, a connection is first of all set up at 802 using a WPAN (Wireless Personal Area Network) profile in order, for example, to set up a Bluetooth link.

A connection is then set up at 804, using a GNSS profile, for example a GPS profile.

A connection is then set up at 806 using an OBEX profile and, finally, the OBEX objects are transmitted at 808.

In addition to the units for insertion of the navigation messages into the generic object exchange profile message 502 and for production of the generic object exchange profile message 504, the navigation terminal according to one embodiment as shown in FIG. 5 also has a communication unit 506 for setting up a connection for transmission of the navigation data. According to this embodiment, the communication unit sets up a connection using a wireless personal area profile; sets up the connection using a global navigation satellite system profile; sets up a connection using a generic object exchange profile; and transmits generic object exchange profile objects.

According to a further embodiment, an authentication procedure is carried out after the GNSS profile connection set up.

According to a further embodiment, status information is transmitted before the OBEX profile connection set up.

These embodiments are described in detail in FIG. 9 using a message flowchart 900 which, by way of example, illustrates in the form of a graphic communication between a car navigation system 902 and a dedicated navigation point 904.

The individual messages are listed in the message flowchart 900. Both the names and the contents of the messages in this case just represent examples. There now follows a description just of the minimum information contained in each of the messages.

The messages are transmitted between a navigation point 904, for example an exhibition entrance, and a navigation system 902 which, for example, is installed in a car.

1. WPAN Profile Connection Set Up 906
    This means the procedure for an ad-hoc connection as described in the attachment, which in this case is initiated by the dedicated appliance 904. All the required parameters are Bluetooth-specific and can be taken from the WPAN profile.
2. Ack Message 908
    The Ack message represents successful completion of the WPAN connection set up. The appliances have been calibrated to a protocol version of the profile, and can now exchange data using the WPAN profile.
3. GPS Profile 910
    This is an initial message in order to set up a GPS profile according to one embodiment. In addition to the version number and profile parameters (for example encryption, master-client role distribution, etc.), this also contains the sender of the message, making it possible to authenticate the navigation point 904. Typical cryptographic methods for authentication are feasible here, such as digital signatures or public-key methods.
4. Ack Message 912
    This is representative of successful completion of the GPS profile connection set up 910. The appliances have been calibrated to a protocol version of the profile, have been authenticated, and can now exchange data using the GPS profile.
5. Available Status Information 914
    The navigation point 904 uses this message to signal to the navigation system 902 what information it has, and in what format and in what version. The version may advantageously include the date of the status of the information. For example, this allows a supplier for an exhibition to decide whether he already has the information or whether a more up to date status is available. The available information may also include just a subset of all the available information, depending on the GPS profile connection set up 910, if it were to be found when setting up the profile that a subscriber terminal cannot process a subset of all the information.
6. Information Request 916
    Once the navigation point 904 has listed the available information, the subscriber terminal can request the desired information, possibly after manual acknowledgment by the subscriber. This is done taking account of the information status already available in the subscriber terminal, and the subscriber preferences.
7. Challenge 918
    If the navigation point 904 issues certain information items only when authorized, the navigation point 904 would use a challenge message 918 to request the subscriber terminal, if the terminal were to have requested authorized information in the previous message. The challenge 918 is generally a random numerical sequence, by means of which the navigation system 902 carries out a calculation with the assistance of a secret key. The navigation point 904 can carry out the same calculation with the same key. If the response (see the response 920) matches the expected value, the subscriber has been identified without the actual (secret) key having been transmitted via the radio interface. Challenge-response methods also exist, which operate on the basis of asymmetric keys. This method could be used to identify rescue services or employees on a company site by means of the navigation point 904, in order to be authorized for specific information.
8. Response 920
    This is the response from the subscriber appliance in the challenge-response method (see challenge 918).
9. OBEX Profile Connection Set Up 922
    This means the connection set up of the OBEX protocol described in the attachment, which is likewise initiated in this case by the dedicated appliance 904. All the required parameters are Bluetooth-specific and can be taken from the OBEX profile.
10. Ack Message 924
    The Ack message 924 represents successful completion of the OBEX profile connection set up 922. The appliances have been calibrated to a protocol version of the profile, and can now exchange data using the OBEX profile.
11. OBEX Objects 926
    This relates to the actual transmission of the navigation data with the aid of OBEX objects 926 according to one embodiment.
12. Ack Message 928
    The Ack message 928 is representative of successful completion of the entire data transmission using the GPS profile. The appliances have exchanged data using the GPS profile, with the aid of OBEX objects. All of the connections and protocols which were set up for this data exchange can be ended. This message 928 indicates the end of the connection.

The abovementioned refinements also apply, where worthwhile, to the navigation terminal described further below.

Figure 10:
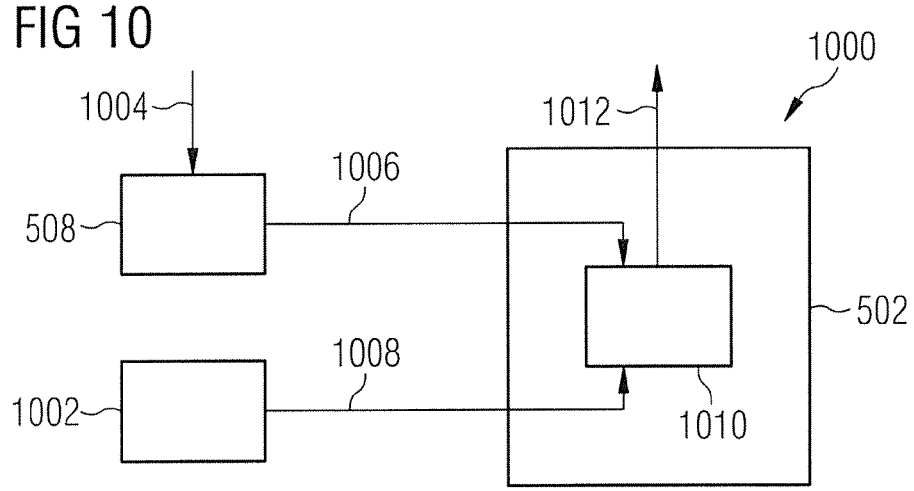
FIG. 10 shows a navigation data insertion device.

FIG. 10 shows a further embodiment of the navigation data insertion unit 502, which receives the information to be inserted both from a navigation data receiving unit 508 via the interface 1006 and the antenna interface 1004, as well as from at least one local or external memory 1002 via the interface 1008. The navigation data is inserted by the navigation data insertion unit 502 into the generic object exchange profile message 1010, and is passed on via the interface 1012 to the next processing instance.

Figure 11:
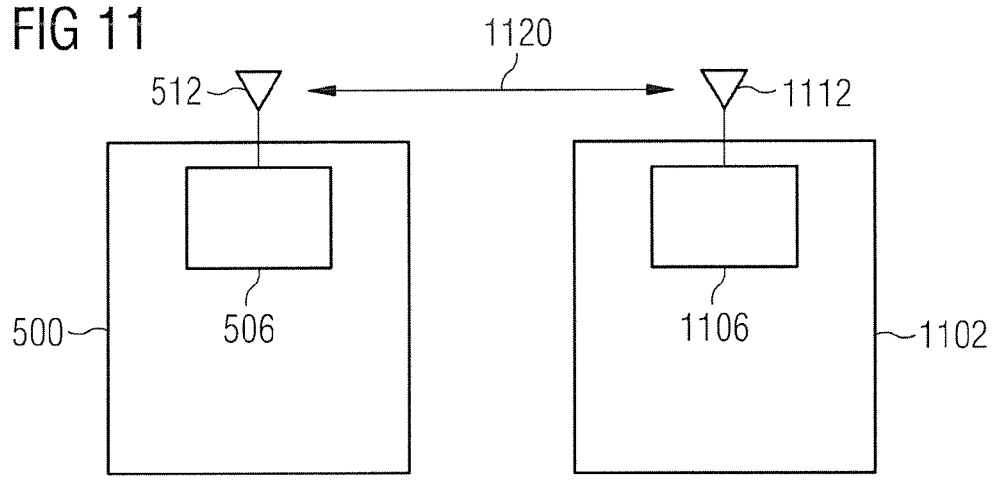
FIG. 11 shows a navigation terminal with a communication unit.

FIG. 11 shows one embodiment of a navigation terminal 500 with a communication unit 506. According to this embodiment, the communication unit sets up a connection to a communication terminal 1102 via a communication interface 1120, for example using the Bluetooth Standard, using a wireless personal area profile.

According to this embodiment, and building on this profile, a connection is set up using a global navigation satellite system profile and, building on the global navigation satellite system profile, a connection is set up using a generic object exchange profile and, finally, a generic object exchange profile is set up. The objects in the generic object exchange profile are then transmitted via the communication interface 1120 to the communication terminal 1102, via the antenna 1112 to its communication unit 1106.

Figure 12:
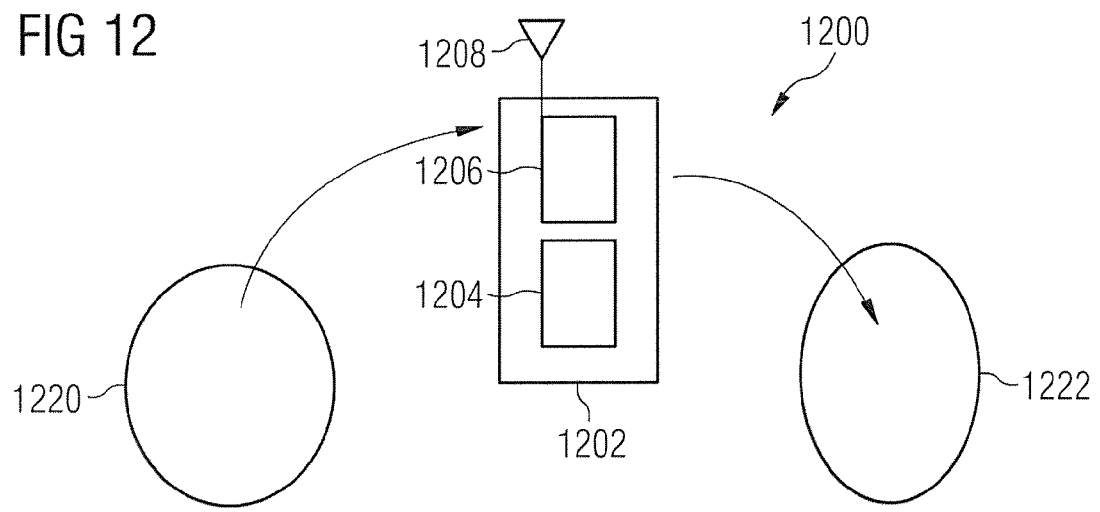
FIG. 12 shows a navigation terminal with a processing unit for navigation data of a first traffic path network, and having a receiving unit for navigation data of a second traffic path network.

FIG. 12 shows a further embodiment of a navigation terminal 1202 which has a processing unit 1204 for processing navigation data about a first traffic path network 1220, and a receiving unit 1206 for receiving navigation data after the navigation terminal 1202 enters an area 1222 of a second traffic path network, with the navigation data about the second traffic path network being coded using a generic object exchange profile.

According to one embodiment, a scenario is assumed in which a delivery company has the job of delivering to various exhibitors on an exhibition site. His Bluetooth-compatible navigation system installed in the vehicle guides the driver on the public road network to the entrance to the exhibition site. A Bluetooth appliance dedicated for navigation purposes is likewise located in the entrance area. The capability to access to this appliance is indicated in the navigation appliance in the vehicle. The driver manually initiates a link (for example by operating a button which is provided for this purpose). The two appliances are connected to one another, as described above, by means of an ad-hoc link. The exhibition administration appliance sets up a link to assist the navigation appliance. Once the version and protocol have been agreed, the exhibition administration appliance offers its information. The appliance in the vehicle compares the offered information with the data records already contained in the appliance. If additional or more up to date information than that stored is offered, the navigation appliance signals this to the driver. The driver orders the appliance to receive the data. The information point at the entrance to the exhibition site starts to transmit the navigation data for the exhibition site in the format according to one embodiment. A map of the site is transmitted with appropriate calibration as a combination of JPEG and vMessage. This is followed by the points of interest, such as exhibition halls, loading ramps, parking spaces, exits, etc in a list of vCards. After successful transmission, the link is broken. The navigation system of the vehicle is now able to likewise navigate the vehicle driver on the exhibition site, away from the public road network.

One embodiment assumes a scenario in which a customer-service employee is visiting a large number of customers using the motor vehicle. For this reason, he maintains a travel log on his laptop. His customer data is also located in his laptop. At regular intervals, he would like to transmit the addresses of his customers as favorites to the navigation appliance in the vehicle in order to allow them to be selected quickly as navigation destinations for his journeys. He would likewise like to load the routes traveled by the passenger vehicle from the navigation appliance into the laptop. The setting up of the link and the transmission of the data take place as described above, for example with reference to FIG. 8 or FIG. 9.

In addition to the capability mentioned above for interaction, the standardization of profiles inter alia offers the advantage that there is only a small scope of freedom remaining for interpretation when an appliance supports a specific profile. This embodiment therefore explicitly includes a Bluetooth GPS profile which can be used in appliances equipped with Bluetooth, such as PDAs, mobile radios, navigation systems and appliances dedicated for this profile.

In addition to conformity with existing Bluetooth standardization and the already mentioned lack of ambiguity with respect to the technical capability of an appliance, which can easily be described by profiles, the effects of this solution include the capability to establish communication between appliances which support the same profile without major effort by the subscriber, and the capability for the transmitted data to be interpreted unambiguously, and thus processed, by all the appliances involved. The exchange of which profile is supported by an appliance takes place within a Bluetooth link by means of the service discovery protocol (SDP), which is available in all Bluetooth-compatible appliances. The pairing for a link takes place using the generic access protocol (GAP), which is likewise provided in every Bluetooth-compatible appliance.

In one embodiment, a method for generating a generic object exchange profile message is provided comprising inserting navigation data into the generic object exchange profile message.

For example, the navigation data is inserted into the generic object exchange profile message using at least one keyword.

For example, the navigation data is inserted into the generic object exchange profile message using an index in addition to the at least one keyword.

For example, the navigation data is inserted into the generic object exchange profile message in a form of a list link, using a plurality of hierarchically grouped keywords.

For example, the method further comprises inserting a message identity into the generic object exchange profile message, in order to link a plurality of object exchange profile messages.

For example, the navigation data is satellite-based position data.

For example, the navigation data is at least one of the following data items: a start address, an intermediate destination address, a destination address; and at least one navigation map.

For example, the navigation data is position-related additional information.

For example, at least some of the navigation data is inserted into the generic object exchange profile message in a form of at least one of the following generic object exchange profile objects: Generic object exchange profile basis text; Generic object exchange profile vCard; Generic object exchange profile vcalendar; Generic object exchange profile vmessage; Generic object exchange profile XTHTML; Generic object exchange profile postscript2; Generic object exchange profile postscript3; Generic object exchange profile PCL5E; Generic object exchange profile PCL3E; Generic object exchange profile PDF; Generic object exchange profile JPEG; and Generic object exchange profile GIF89A.

In one embodiment, a method for generating a generic object exchange profile message is provided comprising inserting navigation data into the generic object exchange profile message in a form of a list link using a plurality of hierarchically grouped keywords.

For example, the navigation data is inserted into the generic object exchange profile message using an index and a keyword.

For example, a message identity is inserted into the generic object exchange profile message in order to link a plurality of object exchange profile messages.

For example, the navigation data is satellite-based position data.

For example, the navigation data is at least one of the following data items: a start address; an intermediate destination address; a destination address; and at least one navigation map.

For example, the navigation data is position-related additional information.

For example, at least some of the navigation data is inserted into the generic object exchange profile message in a form of at least one of the following generic object exchange profile objects: Generic object exchange profile basis text; Generic object exchange profile vCard; Generic object exchange profile vcalendar; Generic object exchange profile vmessage; Generic object exchange profile XTHTML; Generic object exchange profile postscript2; Generic object exchange profile postscript3; Generic object exchange profile PCL5E; Generic object exchange profile PCL3E; Generic object exchange profile PDF; Generic object exchange profile JPEG; and Generic object exchange profile GIF89A.

In another embodiment, a method for providing navigation data is provided comprising processing navigation data about a first traffic path network; entering an area of a second traffic path network; and receiving navigation data about the second traffic path network, with the navigation data about the second traffic path network being coded in accordance with a generic object exchange profile.

For example, the navigation data is transmitted with a generic object exchange profile message.

For example, the method further comprises inserting the navigation data into the generic object exchange profile message using at least one keyword.

For example, the navigation data is inserted into the generic object exchange profile message using an index and a keyword.

For example, the navigation data is inserted into the generic object exchange profile message in a form of a list link, using a plurality of hierarchically grouped keywords.

For example the method further comprises inserting a message identity into the generic object exchange profile message, in order to link a plurality of object exchange profile messages.

For example, the navigation data is satellite-based position data.

For example, the navigation data is at least one of the following data items: a start address; an intermediate destination address; a destination address; and at least one navigation map.

For example, the navigation data is position-related additional information.

For example, the navigation data is inserted into the generic object exchange profile message in a form of at least one of the following generic object exchange profile objects: Generic object exchange profile basis text; Generic object exchange profile vCard; Generic object exchange profile vcalendar; Generic object exchange profile vmessage; Generic object exchange profile XTHTML; Generic object exchange profile postscript2; Generic object exchange profile postscript3; Generic object exchange profile PCL5E; Generic object exchange profile PCL3E; Generic object exchange profile PDF; Generic object exchange profile JPEG; and Generic object exchange profile GIF89A.

In another embodiment, a method for setting up a connection for transmission of navigation data is provided comprising: setting up a connection using a wireless personal area profile; setting up a connection using a global navigation satellite system profile; setting up a connection using a generic object exchange profile; and transmitting generic object exchange profile objects.

For example, the method further comprises carrying out an authentication procedure after setting up the global navigation satellite system profile connection.

For example, the method further comprises transmitting status information before setting up the generic object exchange profile connection.

According to one embodiment, a navigation terminal is provided comprising one unit configured to generate a generic object exchange profile message; and a unit configured to insert navigation data into the generic object exchange profile message.

For example, the unit configured to insert navigation data into the generic object exchange profile message is further configured to insert navigation data into the generic object exchange profile message using at least one keyword.

For example, the unit configured to insert navigation data into the generic object exchange profile message is further configured to insert an index in addition to the at least one keyword.

For example, the unit configured to insert navigation data into the generic object exchange profile message is further configured to insert the navigation data into the generic object exchange profile message in a form of a list link, using a plurality of hierarchically grouped keywords.

For example, the unit configured to insert navigation data into the generic object exchange profile message is further configured to insert a message identity into the generic object exchange profile message, in order to link a plurality of object exchange profile messages.

For example, the navigation data is satellite-based position data.

For example, the navigation data is at least one of the following data items: a start address; an intermediate destination address; a destination address; and at least one navigation map.

For example, the navigation data is position-related additional info/Illation.

For example, at least some of the navigation data is inserted into the generic object exchange profile message in a form of at least one of the following generic object exchange profile objects: Generic object exchange profile basis text; Generic object exchange profile vCard; Generic object exchange profile vcalendar; Generic object exchange profile vmessage; Generic object exchange profile XTHTML; Generic object exchange profile postscript2; Generic object exchange profile postscript3; Generic object exchange profile PCL5E; Generic object exchange profile PCL3E; Generic object exchange profile PDF; Generic object exchange profile JPEG; and Generic object exchange profile GIF89A.

For example, the navigation terminal further comprises a unit configured to set up a connection for transmission of navigation data by setting up a connection using a wireless personal area profile; setting up a connection using a global navigation satellite system profile; setting up a connection using a generic object exchange profile; and transmitting generic object exchange profile objects.

According to another embodiment, a navigation data insertion unit is provided that is configured to insert navigation data into a generic object exchange profile message.

For example, the navigation data insertion unit is further configured to insert the navigation data into the generic object exchange profile message using at least one keyword.

For example, the navigation data insertion is further configured to insert the navigation data into the generic object exchange profile message using an index in addition to the at least one keyword.

For example, the navigation data insertion unit is further configured to insert the navigation data into the generic object exchange profile message in a form of a list link, using a plurality of hierarchically grouped keywords.

For example, the navigation data insertion unit is further configured to insert a message identity into the generic object exchange profile message, in order to link a plurality of object exchange profile messages.

For example, the navigation data is satellite-based position data.

For example, the navigation data is at least one of the following data items: a start address; an intermediate destination address; a destination address; and at least one navigation map.

For example, the navigation data is position-related additional information.

For example, at least some of the navigation data is inserted into the generic object exchange profile message in a form of at least one of the following generic object exchange profile objects: Generic object exchange profile basis text; Generic object exchange profile vCard; Generic object exchange profile vcalendar; Generic object exchange profile vmessage; Generic object exchange profile XTHTML; Generic object exchange profile postscript2; Generic object exchange profile postscript3; Generic object exchange profile PCL5E; Generic object exchange profile PCL3E; Generic object exchange profile PDF; Generic object exchange profile JPEG; and Generic object exchange profile GIF89A.

According to another embodiment, a navigation terminal is provided comprising a communication unit configured to set up a connection for transmission of navigation data, by setting up a connection using a wireless personal area profile; setting up a connection using a global navigation satellite system profile; setting up a connection using a generic object exchange profile; and transmitting generic object exchange profile objects.

For example, the communication unit is further configured to carry out an authentication procedure after the global navigation satellite system profile connection set up.

For example, the communication unit is further configured to transmit status information before setting up the object exchange profile connection.

In another embodiment, a navigation terminal is provided comprising a processing unit which is designed to process navigation data about a first traffic path network; and a receiving unit, which is designed to receive navigation data after the navigation terminal enters an area of a second traffic path network, wherein the navigation data about the second traffic path network is coded in accordance with a generic object exchange profile.

For example, the navigation data is transmitted using a generic object exchange profile message.

For example, the navigation data is inserted into the generic object exchange profile message using at least one keyword.

For example, the navigation data is inserted into the generic object exchange profile message using an index in addition to the at least one keyword.

For example, the navigation data is inserted into the generic object exchange profile message in a form of a list link, using a plurality of hierarchically grouped keywords.

For example, a message identity is inserted into the generic object exchange profile message, in order to link a plurality of object exchange profile messages.

For example, the navigation data is satellite-based position data.

For example, the navigation data is at least one of the following data items: a start address; an intermediate destination address; a destination address; and at least one navigation map.

For example, the navigation data is position-related additional information.

For example, at least some of the navigation data is inserted into the generic object exchange profile message in a form of at least one of the following generic object exchange profile objects: Generic object exchange profile basis text; Generic object exchange profile vCard; Generic object exchange profile vcalendar; Generic object exchange profile vmessage; Generic object exchange profile XTHTML; Generic object exchange profile postscript2; Generic object exchange profile postscript3; Generic object exchange profile PCL5E; Generic object exchange profile PCL3E; Generic object exchange profile PDF; Generic object exchange profile JPEG; and Generic object exchange profile GIF89A.

Although the invention has been illustrated and described primarily in conjunction with specific embodiments, those working in this specialist field should understand that a wide range of modifications can be made to the configuration and the details without departing from the essence and field of the invention as defined by the following claims. The scope of the invention is therefore defined by the attached claims, and the intension is that the claims should cover all changes which are within the scope of the meaning and area of equivalence of the claims.

The invention claimed is:

1. A method for providing a generic object exchange profile message, comprising:
inserting, by a navigation data insertion unit, navigation data into the generic object exchange profile message using an index and a linked list of hierarchically grouped keywords to facilitate interleaving of packets, at least one keyword to indicate a start position or a current geographical position;
wherein said navigation data includes at least one navigation map; and
transmitting, via a communication unit, the generic object exchange profile message,
wherein
the navigation data further comprises imported track lists, each of the track lists includes an intermediate destination address between a start address and a destination address;
the at least one keyword indicates that the inserted data is one of the track lists; and
the index is given correspondingly to addresses included in the track list.

2. The method as claimed in claim 1, further comprising inserting a message identity into the generic object exchange profile message, to link a plurality of object exchange profile messages.

3. The method as claimed in claim 1, wherein the navigation data is communicated using Bluetooth-compatible appliances.

4. The method of claim 1, wherein the navigation map comprises navigation data that is not included on public road maps.

5. The method of claim 1, wherein the navigation data further comprises points of interest.

6. The method of claim 1, wherein the navigation data further comprises at least one of the following data items: a start address, an intermediate destination address, or a destination address.

7. The method of claim 1, wherein the track lists are imported using ASCII (American Standard Code for Information Interchange).

8. The method of claim 1, wherein the track lists are imported using generic objective exchange profile (OBEX) objects.

9. The method as claimed in claim 1, wherein at least some of the navigation data is inserted into the generic object exchange profile message in a form of at least one of the following generic object exchange profile objects:
    Generic object exchange profile basis test;
    Generic object exchange profile vCard; Generic object exchange profile vcalendar;
    Generic object exchange profile vmessage;
    Generic object exchange profile XTHTML;
    Generic object exchange profile postscript2;
    Generic object exchange profile postscript3;
    Generic object exchange profile PCL5E;
    Generic object exchange profile PCL3E;
    Generic object exchange profile PDF;
    Generic object exchange profile JPEG; or
    Generic object exchange profile GIF89A.

10. The method of claim 1, wherein a second one keyword of the linked list is a destination address or a point of interest.

\* \* \* \* \*